US010623636B2

(12) United States Patent
Lowry et al.

(10) Patent No.: US 10,623,636 B2
(45) Date of Patent: Apr. 14, 2020

(54) GENERATING OBJECTS IN REAL TIME PANORAMIC VIDEO (71) Applicant: C360 Technologies, Inc., Wexford, PA (US)

(72) Inventors: Brian C. Lowry, Emlenton, PA (US); Joseph B. Tomko, Wexford, PA (US); Evan A. Wimer, Pittsburgh, PA (US)

(73) Assignee: C360 Technologies, Inc., Wexford, PA (US)

( * ) Notice: Subject to any disclaimer, the term of this patent is extended or adjusted under 35 U.S.C. 154(b) by 0 days.

(21) Appl. No.: 15/753,022

(22) PCT Filed: Aug. 16, 2016

(86) PCT No.: PCT/US2016/047175
§ 371 (c)(1),
(2) Date: Feb. 15, 2018

(87) PCT Pub. No.: WO2017/031118
PCT Pub. Date: Feb. 23, 2017

(65) Prior Publication Data
US 2018/0262684 A1  Sep. 13, 2018

Related U.S. Application Data (60) Provisional application No. 62/205,997, filed on Aug. 17, 2015.

(51) Int. Cl.
*H04N 5/232* (2006.01)
*H04N 7/01* (2006.01)
(Continued)

(52) U.S. Cl.
CPC ........... *H04N 5/23238* (2013.01); *G01S 3/04* (2013.01); *G01S 3/7865* (2013.01);
(Continued)

(58) Field of Classification Search
CPC ............ H04N 5/23238; H04N 7/0122; H04N 7/0806; G06T 19/006; G01S 3/7865; G01S 3/04
(Continued)

(56) References Cited

U.S. PATENT DOCUMENTS

2003/0063133 A1* 4/2003 Foote .................. G06F 3/04815
715/850
2011/0214072 A1* 9/2011 Lindemann ............ G01C 11/02
715/757

(Continued)

FOREIGN PATENT DOCUMENTS

WO  9631047 A2  10/1996

OTHER PUBLICATIONS

International Search Report for PCT Application Serial No. PCT/US2016/047175, dated Oct. 8, 2016, 1 page.

*Primary Examiner* — Allen C Wong
(74) *Attorney, Agent, or Firm* — Ference & Associates LLC (57) ABSTRACT

Disclosed is a method, including, but not limited to, receiving at least one panoramic video including a panoramic space having at least one object; receiving an environmental map, wherein the environmental map comprises an association of the at least one real object to at least one virtual object; augmenting, using the environmental map, the panoramic video, wherein the augmenting includes: rendering a plurality of real objects contained within the panoramic space; and embedding metadata associated with the virtual object into the panoramic video. Other aspects are described and claimed.

20 Claims, 3 Drawing Sheets

(51) Int. Cl.
  *H04N 7/08* (2006.01)
  *G01S 3/04* (2006.01)
  *G01S 3/786* (2006.01)
  *G06T 19/00* (2011.01)

(52) U.S. Cl.
  CPC ......... *G06T 19/006* (2013.01); *H04N 7/0122* (2013.01); *H04N 7/0806* (2013.01)

(58) Field of Classification Search
  USPC .......................................................... 348/36
  See application file for complete search history.

(56) References Cited

U.S. PATENT DOCUMENTS

| | | | |
|---|---|---|---|
| 2013/0249948 A1 | 9/2013 | Reitan | |
| 2014/0033250 A1* | 1/2014 | Kennedy | G06Q 30/02 |
| | | | 725/32 |
| 2014/0199050 A1 | 7/2014 | Khalsa et al. | |
| 2014/0218470 A1* | 8/2014 | Rondinelli | H04N 5/23238 |
| | | | 348/36 |
| 2014/0300775 A1 | 10/2014 | Fan et al. | |
| 2014/0344853 A1 | 11/2014 | Maruyama et al. | |
| 2014/0359680 A1* | 12/2014 | Shivadas | H04N 21/8455 |
| | | | 725/90 |

\* cited by examiner

GENERATING OBJECTS IN REAL TIME PANORAMIC VIDEO

CLAIM FOR PRIORITY

This application claims priority to U.S. Provisional Application No. 62/205,997, filed on Aug. 17, 2015, the contents of which are fully incorporated by reference herein.

BACKGROUND

Panoramic video is becoming increasingly popular. With the availability of inexpensive panoramic cameras, it is becoming commonplace for consumers to record both still images and video. These panoramic cameras are often limited by their resolution, frame rate, and consumer-grade optics. They are typically designed to record video to a memory storage device (e.g., SD micro) for playback at a later time. Broadcast quality cameras, whether panoramic or not, are characterized by high quality optics, high frame rates and resolutions, and adherence to broadcast input/output standards, such as SMPTE 292M, as well as the ability to stream the video in real-time. This is requisite for live broadcasts.

Presently, there is a paucity of panoramic broadcast cameras in the market. The few examples in the market rely on a plurality of cameras to capture the panorama. The video from the plurality of cameras is then off-loaded to a computing engine, where the images are "stitched" into a composite panorama. Additional processing is required to account for the differences in black levels, white balance, CMOS sensor performance, etc. Because of this processing burden, high frame rates are difficult to achieve. As broadcasters move to higher frame rates—60 fps is becoming the norm—the video processing becomes untenable, let alone the ability to augment the panorama in real time.

Augmented reality, likewise, has become commonplace. Numerous technologies exist to enhance broadcast video. One example is Sportvision (www.sportvision.com) which "overlays" graphical objects such as the first-down line for American football; this augmentation is generated in real-time and composited with the video. This conventional system uses motion sensors on multiple broadcast cameras as well as an enhanced version of Chroma key technology (often used for green screen or blue screen backgrounds). Thus, the conventional video augmentation requires a plurality of interacting devices, as well as a complicated calibration process. Moreover, the video processing and overlays are performed on a conceptual two-dimensional space.

Similarly, augmented reality is employed in gaming consoles, where objects, often corresponding to advertising, or avatars, are graphically constructed in real time by the gaming engine. These experiences intended to mimic reality are actually pre-programmed "maps" through which the gamer may navigate.

Other conventional augmented reality applications include smart phone "apps" where a photo taken on the device is augmented. An example would be an app that allows the user to "try on" various eyeglasses, using a facial photo acquired with the mobile device. With few exceptions, most augmented reality experiences are manufactured bespoke applications.

BRIEF SUMMARY

In summary, one aspect provides a method, receiving at least one panoramic video comprising a panoramic space having at least one object; receiving an environmental map, wherein the environmental map comprises an association of the at least one real object to at least one virtual object; augmenting, using the environmental map, the panoramic video, wherein the augmenting comprises: rendering a plurality of real objects contained within the panoramic space; and embedding metadata associated with the virtual object into the panoramic video.

Another aspect provides a system comprising: a processor; a memory in communication with the processor; and computer readable program executable by the processor configured to: receive, in memory, at least one panoramic video comprising a panoramic space having at least one object; receive, in memory, an environmental map, wherein the environmental map comprises an association of the at least one real object to at least one virtual object; augment, using the environmental map, the panoramic video, wherein the augmenting comprises: render, using the processor, a plurality of real objects contained within the panoramic space; and embed metadata associated with the virtual object into the panoramic video.

Another aspect provides a program product code, comprising: a non-transitory computer readable storage medium having computer readable program code embodied therewith, the computer readable program code configured to operating a computing device to perform the acts comprising: receiving at least one panoramic video comprising a panoramic space having at least one object; receiving an environmental map, wherein the environmental map comprises an association of the at least one real object to at least one virtual object; augmenting, using the environmental map, the panoramic video, wherein the augmenting comprises: rendering a plurality of real objects contained within the panoramic space; and embedding metadata associated with the virtual object into the panoramic video.

The foregoing is a summary and thus may contain simplifications, generalizations, and omissions of detail; consequently, those skilled in the art will appreciate that the summary is illustrative only and is not intended to be in any way limiting.

For a better understanding of embodiments, together with other and further features and advantages thereof, reference is made to the following description, taken in conjunction with the accompanying drawings, and the scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Embodiments describe the need for a convergence of a broadcast-quality camera, a single panoramic optic that does not rely on "stitching", and a powerful rendering engine capable of augmenting the panoramic space in real-time with contextually-dependent objects. Moreover, embodiments describe that the task of mapping objects must be simple and elegant, such that mapping can be performed by field operators. The end-user, whether viewing a broadcast or participating interactively via an IP stream on a PC or mobile device will perceive the augmentations as a natural extension of the real video. In other words, using a combination of computer hardware and software, the real video captured by the panoramic video may be augmented in the sense that objects that were not originally captured in the panoramic video are added to the video by digitally drawing or painting (or "rendering") them into the relevant frame or frames of the captured video. Accordingly, embodiments generally contemplate one or more methods for generating environmentally and contextually dependent objects in real time panoramic video.

Panoramic video (360-degree video) is a video recording where a view in every direction is recorded at the same time. Such a video may be accomplished using a panoramic video camera (or omnidirectional camera) or multiple such cameras. Once the video is accomplished, a viewer may control the location, aspect, angle, and the like selected for viewing the video. Embodiments describe that panoramic video is defined as video that captures, by the use of specialty optics, a significantly large field of view as to be analogous to the human eye, such that the observer feels immersed in the viewing environment. "Real Time" video is defined as video that captures events at the instant that they occur.

Embodiments are capable of generating both passive and interactive objects in the three dimensional space commensurate with the panoramic video, thus facilitating the augmentation of the video for the enhancement of the viewing experience, as well as providing didactic, e-commerce, and immersive advertising opportunities.

For a better understanding of the embodiments, together with other and further features and advantages thereof, reference is made to the following description, taken in conjunction with the accompanying drawings.

Embodiments define a Real Object (RO) or Real Objects (RO's) generally as things that are seen in the video. In one non-limiting example, if we are viewing a hockey game, examples of RO's are the goalie, the ads along the "boards", markings on the ice, etc. Embodiments describe the goalie as a dynamic object in that his position changes both in the panoramic space as well as the real environment, whereas the ads along the boards are static in that they do not change positionally in the real environment although they may appear to change in the panoramic space.

Panoramic space is the geometrical coordinate space corresponding to the video captured by a panoramic camera. In one non-limiting example, if the panoramic camera captured an entire hockey arena in panoramic video, the panoramic space would be described by the Euclidean space defined by the hockey arena.

Embodiments define a Virtual Object (VO) or Virtual Objects (VO's) as graphics and/or audio that are generated by the rendering engine, and inserted into the panoramic space such that they appear to exist naturally in the real environment. Classes of VO's include, but are not limited to:
Hotspots: Portions of the panorama that are mapped to external urls or other metadata, such as Wikipedia, telemetry data, biostatistics, etc.
Advertisements: These may be still images or videos that are mapped into the panoramic environment. They may include audio.
User Interface (UI) Elements: These may include pop-ups, pull-downs, menus, and the like.
Overlays: These are graphical elements, often with transparent layers, that are positioned in the panoramic space. They may be static or dynamic.

Rendering is synonymous with painting or drawing, and refers to a software process for drawing virtual objects into the panoramic space. In one non-limiting example, a real object—a hockey dasher board advertisement may be replaced by taking a virtual object—a bitmap advertisement—and rendering it into polygons that correspond to the portion of the panoramic space what was occupied by the hockey dasher board advertisement such that the bitmap replaces the real object.

Embodiments define maps as procedural methods that bind or associate real objects (RO) with virtual objects (VO). A map essentially determines how the rendering engine augments the video via a set of rules. A map may contain cues for further actions, or associate video, image, or metadata with an object. Metadata is a set of one or more data that describes and provides information about the data to which it is associated. Such data may include the time, place, location, and the like from where the data was created. In one non-limiting example, if the data was a hockey player, the metadata could be the player's age or playing statistics or country or birth. Thus, metadata may be any relevant or desired data or set of data about data and this disclosure should not be limited by the examples set forth. A RO may be mapped to one or more VO's such that one augmentation would be apparent when viewing the broadcast stream, while another augmentation would be apparent when viewing the IP stream. Embodiments provide that a data file of such maps is an Environmental Map (EM).

An Environmental Map associates one or more real objects in the panoramic space to virtual objects for the purpose of augmenting the panoramic video. The environmental map is created by an operator operating a software application by navigating in the panoramic space and identifying "real" objects, then associating virtual objects with the real object. In the example of an advertisement on the dasher board in a hockey arena, an operator may outline with a mouse or stylus (or any other suitable user interface device) the "real" area on the dasher board on which a geometrically correctly transformed bitmap ad will be mapped. The environmental map would then contain the coordinates or bounding box of the real ad, and a URL (uniform resource location) for the bitmap to be inserted.

Embodiments define Views as the mechanism by which end users see the panoramic space. In the case of a live broadcast, this is determined by the operator who navigates in the panoramic space. In the case of IP streaming, the end-user determines their view by navigating via the player software as described in greater detail below.

Two non-limiting examples are given:
1. A local ad displayed along the "boards" of a hockey arena may be "replaced" in the video broadcast by either a static image or video. This would only be visible to those watching the live broadcast. The geometry of the ad would be correct regardless of how it is viewed in the panorama.
2. A hockey player, using a RFID tracking device (or any other location identifying device or system), could be augmented by an Internet viewer "touching" the player as he skates in the video. This could then trigger a UI element that would display the player's statistics or a link to purchase their jersey on Amazon.com.

Embodiments provide these non-limiting examples may operate in panoramic space, in such a way as to be invariant as to the viewer's relative position. For this reason, conventional video compositing techniques are ineffective. Embodiments describe using graphics rendering operations that utilize drawing techniques more akin to those used in the gaming industry. Embodiments also describe systems and methods for objectifying and encapsulating the mapping and rendering process such that it is consistent across web-based (IP stream) and broadcast views.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
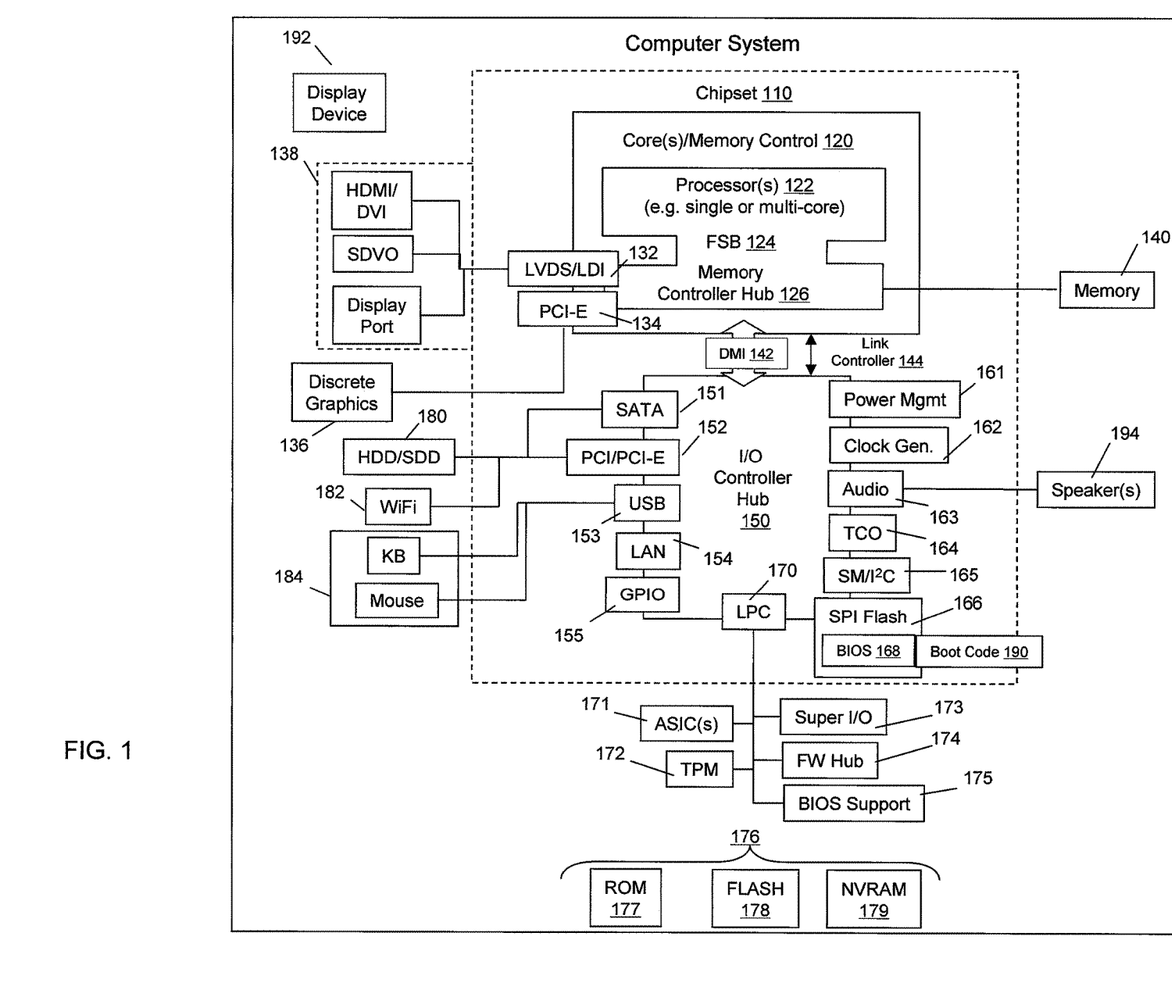
FIG. 1 illustrates an example information-handling device and components thereof.

FIG. 1 depicts a block diagram of one example of information handling device circuits, circuitry or components. The example depicted in FIG. 1 may correspond to computing systems sold by Lenovo Group Ltd., Hewlett-Packard Co., Dell Inc., and others, or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
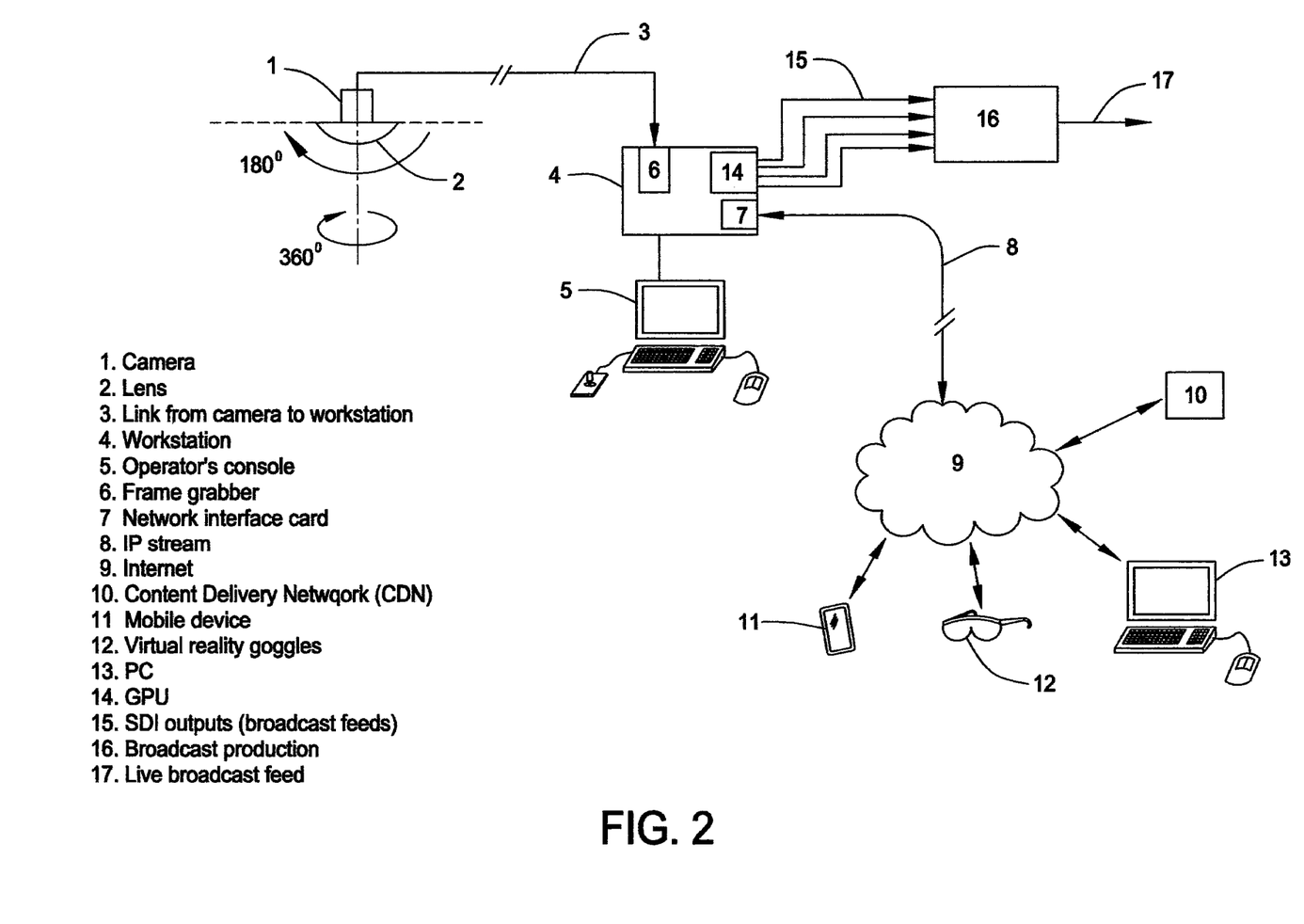
FIG. 2 illustrates an example embodiment.

Referring now to FIG. 2, an example embodiment is provided. Embodiments provide that the panoramic camera (1) is capable of capturing 182°×360°—essentially a hemisphere. This is more than adequate to mimic the human field of view of approximately 180°×135°. Embodiments provide that a JAI® SP-20000C-CXP2 may be used for the panoramic camera (1). (JAI® is a registered trademark of JAI A/S Corporation). The panoramic camera (1) is typically suspended from the "center of action" so that an observer viewing the camera video feels as if they are, too, in the center of the action. In one non-limiting example, the panoramic camera (1) may be suspended facing down in a basketball or hockey arena from the center scoreboard. Multiple panoramic cameras may be employed for sports and events that play out over larger areas, such as football (e.g., soccer) or American football. For some applications, mounting the camera facing up or facing out (e.g., mounting on a wall) are warranted.

At FIG. 2, embodiments provide that the panoramic camera (1) is equipped with a panoramic lens (2). The panoramic camera (1) communicates with a workstation (4) that may be remote from the camera location. Embodiments provide that the communication may be accomplished through high-speed fiber optic links at (3). Embodiments provide the optic links employed may be CoaXpress (CXP) that may be extended to up to 10 Kilometers using fiber extenders. Embodiments provide that a PC manufactured by BOXX Technologies, Inc. and equipped with an INTEL® Core 17 (INTEL® is a registered trademark of Intel Corporation) with a 6 core liquid cooled and overclocked processor may be used as the workstation (4). Embodiments provide that the workstation (4) is connected to an operator's console (5) that allows the operator to use a joystick to outline both VO's and RO's that are then mapped.

Embodiments provide that the operator's console (5) may be equipped with a conventional HD monitor, a keyboard, a mouse, and a sophisticated joystick. Embodiments provide that an AXIS T8311 joystick may be employed. Embodiments provide that the workstation (4) receives the video signals—a succession of video frames—via a frame grabber card (6). A non-limiting example of one such frame grabber card would be the BITFLOW Cyton CXP equipped with GPU Direct® (GPU DIRECT® is a registered trademark of NVIDIA) software allowing the frame grabber card to communicate directly with a NVIDIA® GPU.

Embodiments provide that the frame grabber card (6) passes each video frame, via a circular memory buffer, to the Graphics Processing Unit (GPU) (14). Embodiments provide that a NVIDIA® K6000 (NVIDIA® is a registered trademark of NVIDIA) may be used as the GPU. Embodiments provide this as the first stage in the video pipeline (VP). In the GPU (14), video frames may be debayered, as well as other necessary video transformations, such as motion compensation, white balance, black level correction, etc.

Embodiments provide that due to the ultra-wide angle lens employed on panoramic lens (2), the video frames must go through an additional VP stage termed dewarping. The dewarping process is a mathematical and spatial transformation that removes all distortions (such as caused by the location of an RO relative to the chosen camera's location, angle, aspect, perspective, etc.) as seen from the viewer's perspective in the panorama. For example, without this dewarping a rectangular RO might be distorted and appear like a trapezoid when rendered. The transformation matrix is uniquely related to the specific geometry of the lens. More details regarding additional desirable processing are given below.

Embodiments provide that after the final VP stage, the signal may be separated into multiple independent broadcast signals, as well as an IP stream (8). Each broadcast stream may provide a unique view in the panorama space captured by the panoramic camera (1). These views may be controlled by the operator using the operator's console (5), via a joystick or mouse and simple menu commands.

Embodiments provide that output from the operator's console may comprise one or more IP streams (8) and one or more broadcast streams. Embodiments provide that the broadcast streams are transmitted from the GPU (14) through an SDI (serial digital output) (15) and are ingested by the broadcaster's production equipment (16) for use in televised events as well as captured for replay and officiating. At 17, the broadcast may be sent out to various end users (i.e., televised, relayed) with television signal receivers or cable, fiber optic, or satellite signal receivers.

At FIG. 2, Embodiments provide that IP stream (8) is sent through the Internet (9) via a network interface card (7) installed in the workstation (4). Embodiments provide that the network interface card (7) may operate at 100 Gb per second upload speed. Embodiments further provide that the IP stream (8) may be ingested by a Content Delivery Network (CDN) (10) also connected to the Internet. The CDN (10) may provide transcoding and disbursement of one IP stream (8) to multiple simultaneous end users. Transcoding is the process wherein the make and model of a given end user's device is detected and responded to with the appropriate video format and resolution being streamed to the end user's device. Embodiments provide that end users, utilizing desirable software, may view and interact with the IP stream (8) through various mobile computing devices, non-limiting examples include a mobile phone (11), virtual reality goggles (12), or a conventional personal computer (13).

Embodiments provide that the end users view the streamed panorama data in specialty software that is designed to dewarp the panorama embedded in each video frame. Because the entire panorama in the IP stream (8) is distributed to each end user, each user has the ability to navigate through the panorama independently, providing an individualized viewing experience. Embodiments provide that an end user may touch his or her screen receiving the IP stream (8) to select the location and angle of the camera, changing their view on their individual screen. In some non-limiting examples, an end user may touch a RO on their screen receiving the IP stream (8) and cause a pull down menu to appear, or pop-up a list of additional relevant information, such as stats for a hockey player in our example, or touch a hyperlink displayed above the RO.

Embodiments provide that the number of broadcast streams may be dependent upon the number of GPUs in the workstation, with each GPU typically providing four independent outputs. Embodiments provide that outputs may conform to the SMPTE292M standard and are delivered via SDI hardware. At a frame rate of 30 frames per second (fps), each video frame must be processed in approximately 33.3 milliseconds.

Embodiments provide that it is critical that the latency to push frames through the VP is significantly less than the time per frame as constrained by the frame rate. The difference in these times is the time budget allotted for the rendering engine to augment the video from the cues present in the Environmental Map (EM). For the present non-limiting example embodiment with the camera running at 30 fps, the VP time is ~13 ms, giving the rendering engine~20 ms in which to augment the video streams. The larger this time budget, the greater the number and sophistication of VO's.

Figure 3:
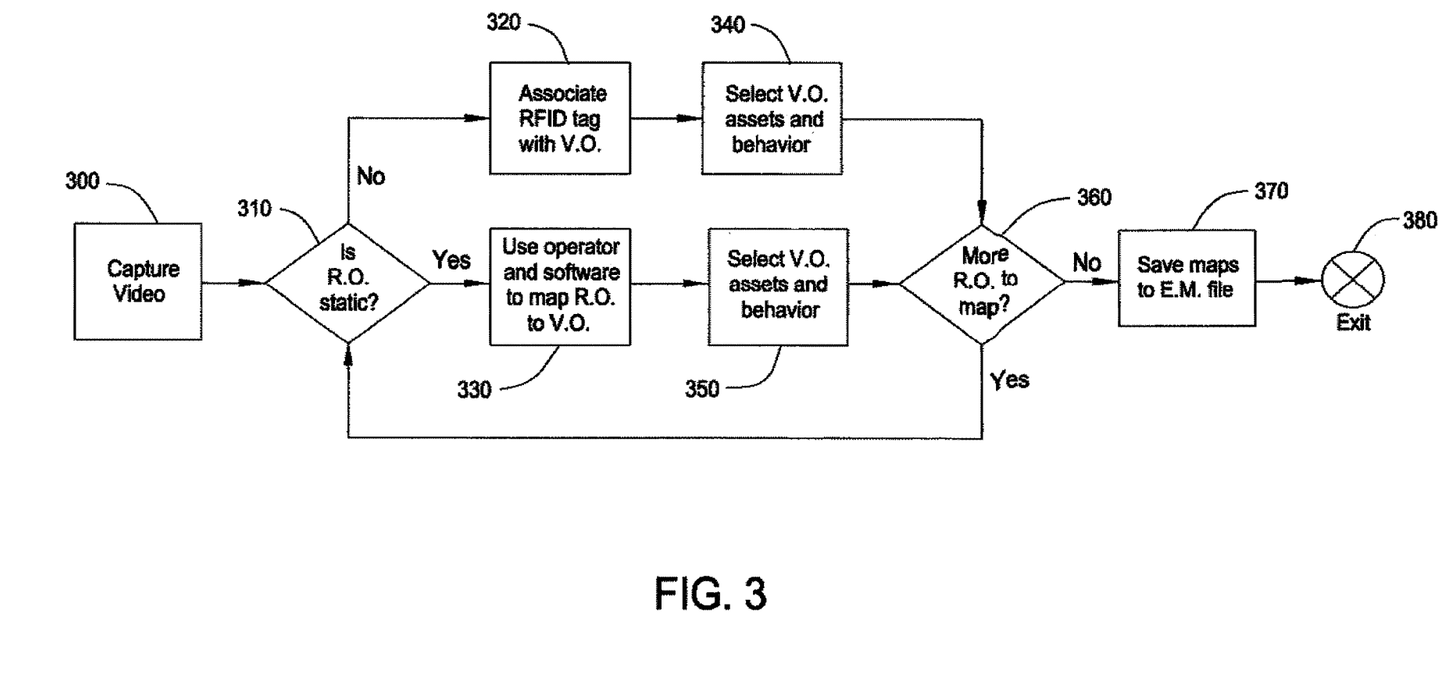
FIG. 3 illustrates an example embodiment.

Referring now to FIG. 3, a flow chart of an example embodiment is shown. Embodiments provide that prior to broadcasting and streaming a live event, the operator must create an Environmental Map (EM). The EM consists of a collection of RO-to-VO associations (or maps). Embodiments provide that these maps may be stored in a disk file on a workstation. Embodiments provide that the EM procedure may be performed at an operator's console by an operator.

In FIG. 3, at 300, the panoramic video is captured by a workstation equipped with a GPU and transmitted to the operator's console. With a panoramic camera in situ, the operator navigates through the panoramic space. At 310, the operator identifies an RO. If the RO is a static object, then at 330, the operator uses a mouse or joystick or other input device to outline or define a bounding box for the RO. The operator then uses a context menu to map the RO to the VO.

Using one non-limiting example of an ad located on the hockey arena "boards", the operator may construct a polygon that conforms to the shape—as seen on his display—of the ad. This is noteworthy in that the location of the RO in the panoramic space is independent of the operator's position in that space. For example, if the operator "zoomed in" such that the local ad on the board appeared larger on his display, it would still identify the same position in panoramic space as if he had drawn the polygon while zoomed out. This is due to the affine transformations employed in navigating through the panoramic space. Thus, the description in the EM of static RO's is projection invariant.

In FIG. 3, at 340, after highlighting this local ad (RO) with a polygon, the operator may then associate one or more VO's with the RO. VO's contain descriptions for both assets and behaviors. Assets are items such as disk files (or data files), whereas behaviors are actionable items, such as "display popup". For example, the operator may elect to "replace" the local ad with a static image file asset (e.g., a PNG, JPG, or BMP). At 360, if there are more ROs to map, the operator continues this process for all RO's. Once all the RO's are mapped both static and dynamic, at 370, the EM may be saved in XML format in a schema not dissimilar from the w3c HTML image map command. The syntax and grammar employed by the EM is propriety yet extensible since it is derived from XML.

Embodiments provide that mapping dynamic RO's (in contrast to static RO's) is a slightly different procedure due to the fact that the dynamic RO's do not necessarily exist in the panorama. For example, a dynamic RO example might be, in our non-limiting hockey example, the goalie with an RFID transmitter. If the goalie were in the locker room, he would not appear in the panoramic space. Thus, mapping dynamic RO's must be accomplished through an explicit declaration.

Continuing with FIG. 3, if the RO is not static (i.e., dynamic) at 310, then at 320 the operator associates the RO's RFID tag or other location identifying mechanism with a VO. At 340, the operator selects the VO assets and behavior and maps them. Finally, at 380, all the panoramic video and EM is transmitted.

Embodiments provide that the GPU rendering engine transforms the EM into real-time augmentations of the video stream, and in particular the ROs. These augmentations are contextually dependent upon the end user's view. The implementation of the EM differs between the IP and broadcast streams due to the interactive nature of the IP stream.

Embodiments provide that the rendering process proceeds through various stages where EM associations are handled contextually. When the real-time acquisition of video commences, the operator chooses the EM made prior to the event. The EM file is parsed and then separated into two masks—a static mask that describes static RO's, and a dynamic mask that describes RO's that are interactive in nature.

Embodiments provide that in the first stage all static RO's are rendered for the entire panoramic space. This affects both broadcast and IP streams. The static mask is used to "paint" the VO's on to the RO's in a frame-by-frame manner. The process for performing this operation is complicated by the possible occlusion of the RO by objects in the panoramic space. For example, if our RO is an ad on the boards of a hockey game, and several players were to skate in front of the ad as observed from the camera's point of view, then the VO—a still image or video ad—would need to be painted "behind" (at a lower z-index) than the skaters so that the scene appears natural. This is accomplished on a frame-by-frame basis so that as objects in the foreground occlude the RO, the occlusion mask is dynamically altered. Gaussian Mixture Modeling (GMM) and other GPU-accelerated methods may be employed to create the occlusion mask in real-time that may then be "subtracted" from the VO. Currently, such real-time processing is only possible on GPUs which are designed to process many video frames concurrently at high frame rates.

Embodiments provide that RO's that are moving in the panoramic space, e.g., a hockey player skating, may be rendered in the same fashion due to the fact that on a frame-by-frame basis, all the objects (RO and VO) are essentially "stopped" and are dealt with as described in the preceding paragraph.

Embodiments provide that interactive VO's are processed in a second stage. The IP stream encapsulates the entire panorama in the form of a 4:3 aspect ratio video frame where the dimensions correspond maximally to the dimensions of the camera CMOS dimensions. Video codecs, for example, H.264 and H.265/EVC allow for the embedding of metadata on a frame-by-frame basis in the available payload of each video frame. Embodiments provide that additionally, metadata may also be embedded in digital structures such as QR codes located in the portions of the video frame unused by the panoramic ellipse. This unused area exists due to the fact that an oval of information is being capture on the camera sensor, but the sensor is rectangular in shape. Thus, the corners of the rectangle do not convey video information and can be used for storing metadata. In this way, metadata, containing the interactive subset of the EM can be passed on a frame-by-frame basis to the end-user's viewing device.

In the non-limiting example of tracking a hockey player (RO), the RFID transmitter affixed to the player relays his position to a receiver which packages the data with the current video frame metadata. It will be appreciated that embodiments provide that any location identifying apparatus or system may be used to locate the player's position. Embodiments provide that if a VO popup is associated with this dynamic RO, then an end-user, viewing the game on a tablet, may "touch" the location of the player on the screen and see a pre-defined popup appear with some type of additional data, for example, the player's stats for the game. Unlike the broadcast case, this rendering may be done at the client-side, on the user's viewing device. Embodiments provide that this functionality may be built in to the player software such that the metadata associated with the H.264 stream is cooperatively parsed and interpreted in real time.

While the various example embodiments have been described in connection with the examples provided herein, these were provided as non-limiting examples. Accordingly, embodiments may be used in similar contexts with similar devices and methods.

It will be appreciated that while example embodiments have described utilizing panoramic cameras and lenses, conventional video cameras and lenses are equally applicable to the embodiments described herein.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable memory or storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Embodiments provide that panoramic video may be stored in the memory of at least one device and displayed on at least one display device. Augmented panoramic video may be stored in the memory of at least one device and displayed on at least one display device.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    receiving at least one panoramic video comprising a panoramic space having at least one object, wherein the at least one panoramic video comprises a live-video feed of the panoramic space;
    receiving an environmental map, wherein the environmental map comprises an association of the at least one real object to at least one virtual object;
    augmenting, using the environmental map, the panoramic video, wherein the augmenting comprises augmenting the panoramic video before transmission of a signal in substantially real time with the capture of the at least one panoramic video, the signal comprising at least a portion of the augmented panoramic video to an end user and wherein the augmenting comprises:
        rendering a plurality of real objects contained within the panoramic space; and
        embedding metadata associated with the virtual object into the panoramic video.

2. The method of claim 1, wherein the at least one real object is selected from the group consisting of: a static real object and a dynamic real object.

3. The method of claim 1, wherein the rendering comprises layering the at least one virtual object that is associated with the at least one real object on top of the at least one real object.

4. The method of claim 3, wherein the layering is completed on a frame-by-frame basis.

5. The method of claim 3, further comprising generating an occlusion mask, wherein the occlusion mask occludes a background portion associated with a foreground object.

6. The method of claim 1, wherein the at least one virtual object comprises an interactive virtual object.

7. The method of claim 1, wherein the embedding metadata comprises embedding metadata on a frame-by-frame basis.

8. The method of claim 1, wherein the embedding metadata comprises embedding the metadata at a location in the video frame that corresponds to the at least one real object having the association to the virtual object.

9. The method of claim 1, wherein the transmitting comprises separating the augmented panoramic video stream into at least one broadcast stream and at least one Internet protocol stream.

10. The method of claim 1, wherein the environmental map is separated into at least one static mask and at least one dynamic mask.

11. The method of claim 10, wherein the rendering comprises rendering static real objects using the at least one static mask and rendering dynamic real objects using the at least one dynamic mask.

12. A system, comprising:
a processor;
a memory in communication with the processor; and
computer readable program executable by the processor configured to:
receive, in memory, at least one panoramic video comprising a panoramic space having at least one object;
receive, in memory, an environmental map, wherein the environmental map comprises an association of the at least one real object to at least one virtual object, wherein the at least one panoramic video comprises a live-video feed of the panoramic space;
augment, using the environmental map, the panoramic video, wherein the augmenting comprises augmenting the panoramic video before transmission of a signal in substantially real-time with the capture of the at least one panoramic video, the signal comprising at least a portion of the augmented panoramic video to an end user and wherein the augmenting comprises:
render, using the processor, a plurality of real objects contained within the panoramic space; and
embed metadata associated with the virtual object into the panoramic video.

13. The system of claim 12, wherein the at least one real object comprises a static real object and wherein the characteristic comprises a boundary of the static real object.

14. The system of claim 12, wherein the at least one real object comprises a dynamic real object and wherein the characteristic comprises a location identification mechanism associated with the at least one real object.

15. The system of claim 14, wherein the location identification mechanism comprises a tracking tag.

16. The system of claim 12, wherein the associating is based upon user input.

17. The system of claim 12, wherein the at least one virtual object comprises a description for an asset and a description for a behavior.

18. A non-transitory computer readable storage medium, comprising:
a non-transitory computer readable storage medium having computer readable program code embodied therewith, the computer readable program code configured to operating a computing device to perform the acts comprising:
receiving at least one panoramic video comprising a panoramic space having at least one object, wherein the at least one panoramic video comprises a live-video feed of the panoramic space;
receiving an environmental map, wherein the environmental map comprises an association of the at least one real object to at least one virtual object;
augmenting, using the environmental map, the panoramic video, wherein the augmenting comprises augmenting the panoramic video before transmission of a signal in substantially real-time with the capture of the at least one panoramic video, the signal comprising at least a portion of the augmented panoramic video to an end user and wherein the augmenting comprises:
rendering a plurality of real objects contained within the panoramic space; and
embedding metadata associated with the virtual object into the panoramic video.

19. The non-transitory computer readable storage medium of claim 18, wherein the at least one real object comprises a static real object and wherein the characteristic comprises a boundary of the static real object.

20. The non-transitory computer readable storage medium of claim 18, wherein the at least one real object comprises a dynamic real object and wherein the characteristic comprises a location identification mechanism associated with the at least one real object.

* * * * *